UNITED STATES PATENT OFFICE.

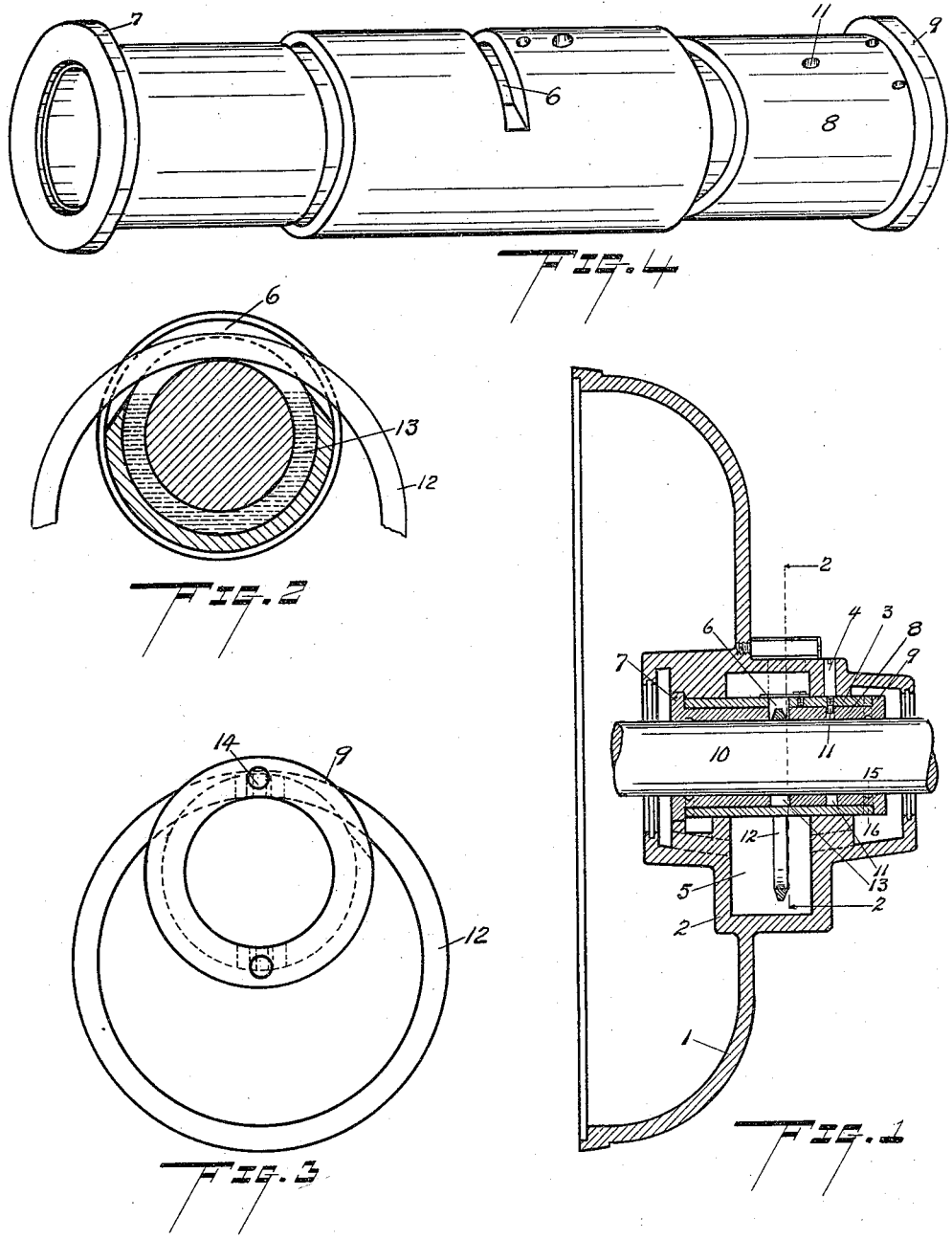

CARL L. DAUN, OF SAGINAW, MICHIGAN.

JOURNAL-BEARING FOR ELECTRIC MACHINES.

1,176,037.  Specification of Letters Patent.  Patented Mar. 21, 1916.

Application filed October 14, 1915. Serial No. 55,805.

*To all whom it may concern:*

Be it known that I, CARL L. DAUN, a citizen of the United States, residing at Saginaw, in the county of Saginaw and State of Michigan, have invented certain new and useful Improvements in Journal-Bearings for Electric Machines; and I do hereby declare the following to be a full, clear, and exact description of the invention, such as will enable others skilled in the art to which it appertains to make and use the same.

This invention relates to journal bearings and pertains more particularly to journal bearings used in certain classes of machines in which it is essential that means be provided for accurately maintaining the central position of the shaft carried by the bearing, and to provide means for easily and quickly restoring the shaft to its correct central position when the shaft has been allowed to depart from that position by even very small amounts of wear in the bearing. An example of a class of machines in which such exactness of alinement of the shaft is required to be maintained is electric motors, generators and similar electric machines, employing an inner revolving member and an outer stationary member, the clearance between the two members being very small, and being known as the "air-gap". It is essential that this thin air-gap shall be maintained of a uniform thickness throughout the circumference of the rotating member, so as to leave a true annular spaced of even thickness between the revolving and the stationary members. If, by reason of wear, the axis of the inner member is permitted to drop, even a very slight amount, the thickness of the air-gap becomes greater at one place than it is at another, resulting in decreased efficiency of the electric machine. The importance of maintaining extreme accuracy of alinement of the shaft axis will be appreciated when it is noted that the usual air-gap is about one-sixty-fourth of an inch in thickness and a distortion of this gap due to wear of the shaft bearings, equal to one-half that amount, causes a large percentage of drop in electrical efficiency of the motor, and because of the resulting increased magnetic pull, the wear of the bearing rapidly increases.

It is the purpose, therefore, of my present invention to provide a bearing construction that is simple in design, consisting of but few parts, and yet capable of easily and quickly restoring the axis of the shaft to its central position after the bearing has become worn, even though the amount of wear is very small, and to expose at each adjustment a new bearing surface to take the weight of the shaft and its load.

A further purpose is to so construct the bearing that the shaft alinement can be accurately and properly made by an unskilled person.

With these and other objects in view, which will appear later in the specification, my invention comprises the devices described and claimed, and the equivalents thereof.

In the drawings, Figure 1 is a vertical transverse section through a bearing embodying my improvement. Fig. 2 is a transverse section on the line 2—2 of Fig. 1. Fig. 3 is an end view of the bushing with the oil ring in place. Fig. 4 is a perspective view of the bearing sleeve, and the two bushings to be received within it.

As is clearly shown in the drawings, the device consists in the usual machine or motor frame 1, carrying the housing 2, in which the bearing is mounted. The bearing, which is preferably of the ring-oiling type, is constructed as follows: A cylindrically bored sleeve 3 is mounted in the housing, being preferably held in place by a pin 4 passing through the housing and through the sleeve 3. The housing is formed with the usual oil chamber 5, which surrounds the middle part of the sleeve 3, as shown in Fig. 1. The upper part of the sleeve is formed with a transverse slot 6, as shown in Figs. 2 and 4. The inner end of the sleeve 3, that is, the end nearest the revolving member of the machine, is provided with a flanged bushing 7 of brass, or other suitable metal. One face of its flange bears against the inner end of the sleeve 3, and also against a shoulder of the housing 2, as shown in Fig. 1, to take any end thrust of the rotating member of the machine. The bushing 7 extends into the sleeve to the edge of the slot 6, and similarly a second bushing 8 is inserted in the sleeve from its outer end, and extends to the edge of the slot 6. This outer bushing is formed with an annular flange 9. The inner bushing 7 is preferably pressed into the sleeve 3 with sufficient pressure to cause it to frictionally engage the bushing to prevent turning of the sleeve when the shaft 10 is running with proper lubrication, but if shaft 10 should heat or "seize" and bind in the bushing 7, the bushing may then revolve in the sleeve 3 as a bearing, to prevent injury to the machine. The outer bushing 8 is pressed into the sleeve with a snug fit and is preferably formed with a hole 11 to receive the inner end of the pin 4, by which the bushing 8 is normally held in place in the sleeve. The bushing 8 is preferably formed with two or more of these openings 11, as shown in Fig. 1, to permit the bushing to be turned to and secured in various adjusted positions, for the purposes presently to be described. An oiling ring 12 is loosely received in the slot 6 and rests on the upper periphery of the shaft 10, the lower part of the ring dipping into the oil of the chamber 5 to lubricate the shaft in the usual manner. Between the ends of the bushings 7 and 8 there is an annular cup-like space 13 completely inclosed by the sleeve 3, except for the opening provided by slot 6. The space 13, which extends around approximately two-thirds of the circumference of the shaft fills with oil and will remain full so long as the ring 12 properly performs its function of drawing up oil from chamber 5 and depositing it on the shaft, but in case chamber 5 is allowed to run dry, the annular space 13 contains sufficient oil to keep the shaft lubricated for a considerable length of time, thus serving as a means of lubricating in emergency. Another advantage of the cup is that during cold weather the oil in chamber 5 may become chilled and stiff and when the motor starts under such conditions the ring does not begin to turn until the oil is warmed. This cup 6 contains sufficient oil to lubricate the bearing until the ring begins to operate. When the bushings 7 and 8 have become slightly worn, so as to allow the axis of shaft 10 to depart from its true position, even by a very small amount, it is merely necessary to remove the pin 4 and rotate the outer bushing 8 a half turn, in order to restore the shaft 10 to its proper alinement, after which pin 4 is replaced in one of the openings 11 of the bushing. To permit bushing 8 to be easily turned without removing the shaft, or any other parts of the machine, I provide pockets, or recesses, 14 in the outer face of its flange 9, to receive the end of a punch, or other tool by which the bushing 9 may be rotated a half turn of the sleeve 3, as above described. To remove the oil from the ends of the bearing, I provide oil grooves 15 in the bushing and provide openings 16 through which the oil may drop into the housing, as indicated in Fig. 1.

By the means above described, I have produced a simple, relatively inexpensive, and efficient device for lubrication of motor and other bearings and have embodied in it means whereby the minute adjustment required in this class of bearings may be effected, without the use of screws, or similar adjusting means. It will further be noted that after wear of the bearing has occurred and the shaft alinement has been restored by rotating the outer bushing in the manner described, there will be no tendency for the shaft to chatter, as would be the case if both of the bushings were rotated, or if the bushings were formed integral instead of independent, as herein described.

Having thus described my invention, what I claim and desire to secure by Letters Patent is:

1. The combination of a shaft, a housing, a cylindrically bored sleeve carried by said housing, a bushing inserted in the inner end of said sleeve and extending part way therethrough, a second bushing rotatably inserted in the outer end of said sleeve and extending part way therethrough, and means adapted to secure said second bushing in various circumferentially adjusted positions, for the purposes set forth.

2. The combination of a shaft, a housing, a cylindrically bored sleeve carried by said housing, a bushing inserted in the inner end of said sleeve and extending part way therethrough, said bushing held in place by frictional engagement with said sleeve, a second bushing rotatably inserted in the outer end of said sleeve and extending part way therethrough, a flange on said bushing, said flange formed with tool-receiving openings, and fastening means adapted to secure said second bushing in various circumferentially adjusted positions, for the purposes set forth.

3. In a shaft-bearing, the combination of a suitably supported cylindrically bored sleeve, a bushing inserted in the inner end of said sleeve and extending part way therethrough, said bushing releasably held in frictional engagement with said sleeve, a second bushing rotatably inserted in the inner end of said sleeve and extending part way therethrough, a flange on said second bushing, said flange formed with tool-receiving openings, and fastening means adapted to secure said second bushing in various circumferentially adjusted positions.

4. The combination of a shaft, a housing formed with an oil chamber, a cylindrically bored sleeve extending across said oil chamber and formed with a circumferentially disposed slot in its upper part, a bushing inserted in the inner end of said sleeve and extending part way therethrough, a second bushing rotatably inserted in the outer end of said sleeve and extending part way therethrough, the adjacent ends of said bushings spaced apart to form a cup between them, fastening means adapted to secure said second bushing in various circumferentially adjusted positions, an oil-carrying ring loosely received in the slot of said sleeve and resting on said shaft, the lower part of said ring extending into said oil chamber.

5. The combination of a shaft, a housing formed with an oil chamber, a cylindrically-bored sleeve carried by said housing and projecting across said chamber, said sleeve formed with a transverse slot, a bushing inserted in the inner end of said sleeve and having one end substantially in register with one edge of said slot, an outer bushing inserted in the outer end of said sleeve, one end of said bushing being substantially in register with the outer edge of said slot, said outer bushing adapted to be rotated in said sleeve, to restore the alinement of the shaft and present a new bearing surface for said shaft, and means for securing said sleeve in its adusted position, together with an oiling ring received in the slot of said sleeve, for the purposes set forth.

In testimony whereof, I affix my signature in presence of two witnesses.

CARL L. DAUN.

Witnesses:
NELLIE M. ANGUS,
ROY WALLIS.

Copies of this patent may be obtained for five cents each, by addressing the "Commissioner of Patents, Washington, D. C."